US010556193B2

(12) United States Patent
Dyer

(10) Patent No.: US 10,556,193 B2
(45) Date of Patent: Feb. 11, 2020

(54) INTEGRATED O2RU SYSTEM

(71) Applicant: Hamilton Sundstrand Corporation, Charlotte, NC (US)

(72) Inventor: Gerald P. Dyer, Suffield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 204 days.

(21) Appl. No.: 15/706,078

(22) Filed: Sep. 15, 2017

(65) Prior Publication Data

US 2019/0083905 A1 Mar. 21, 2019

(51) Int. Cl.
*B01D 19/00* (2006.01)
*B64D 37/32* (2006.01)
*B01D 63/06* (2006.01)

(52) U.S. Cl.
CPC ......... *B01D 19/0031* (2013.01); *B01D 63/06* (2013.01); *B64D 37/32* (2013.01)

(58) Field of Classification Search
CPC ...........................................................
B01D 19/0031; B01D 19/0036; B01D 53/22; B01D 2257/104; B64D 37/32; B64D 37/34; F02C 7/22; F02C 7/224; F23K 5/18
See application file for complete search history.

(56) References Cited

U.S. PATENT DOCUMENTS

| 3,620,652 A | 11/1971 | Jaspers et al. |
| 4,102,609 A | 7/1978 | Wood |
| 4,391,184 A | 7/1983 | Yamane et al. |
| 4,524,793 A | 6/1985 | Silverwater |
| 5,299,917 A | 4/1994 | Schultz |
| 5,494,410 A | 2/1996 | Maier-Laxhuber et al. |
| 6,315,815 B1 * | 11/2001 | Spadaccini ........ B01D 19/0031 95/46 |
| 7,569,099 B2 | 8/2009 | Coffin |
| 8,291,928 B2 | 10/2012 | Reid et al. |
| 8,679,226 B2 | 3/2014 | Parsons |
| 8,741,029 B2 | 6/2014 | Cordatos et al. |
| 9,267,464 B2 | 2/2016 | Ulrey et al. |

(Continued)

FOREIGN PATENT DOCUMENTS

| DE | 222892 C | 6/1910 |
| DE | 10041555 A1 | 3/2002 |

(Continued)

OTHER PUBLICATIONS

European Search Report for Application No. 18189721.6-1010, dated Dec. 4, 2018, 10 pages.

(Continued)

*Primary Examiner* — Jason M Greene
(74) *Attorney, Agent, or Firm* — Cantor Colburn LLP

(57) ABSTRACT

An oxygen removal system for removing dissolved oxygen from fuel within a fuel system includes a first housing, a second housing, a membrane filter, a piston assembly, and an outlet cap. The first housing extends along a first axis between a first housing first end and a first housing second end. The second housing is disposed about the first housing. The membrane filter is disposed between the first housing and the second housing. The piston assembly has a piston housing that is disposed about the second housing. The piston assembly is arranged to generate a vacuum to remove a fluid from the membrane filter.

11 Claims, 3 Drawing Sheets

(56) References Cited

U.S. PATENT DOCUMENTS

| | | |
|---|---|---|
| 9,566,553 B2 | 2/2017 | Theodore et al. |
| 9,604,837 B2 | 3/2017 | Brown et al. |
| 10,118,109 B1 | 11/2018 | Dyer |
| 2005/0137441 A1 | 6/2005 | Cordatos et al. |
| 2007/0163433 A1 | 7/2007 | Chen et al. |
| 2008/0231650 A1 | 9/2008 | Kojima et al. |
| 2008/0257146 A1 | 10/2008 | Spadaccini et al. |
| 2010/0030151 A1* | 2/2010 | Kirsch ............... B01D 19/0031 604/126 |
| 2010/0294128 A1 | 11/2010 | Schmidt et al. |
| 2012/0186562 A1 | 7/2012 | Achor |
| 2013/0047845 A1* | 2/2013 | Sampath ............ B01D 19/0031 95/46 |
| 2013/0343934 A1 | 12/2013 | Du |
| 2015/0078919 A1 | 3/2015 | Hong et al. |
| 2015/0176715 A1 | 6/2015 | Huang et al. |
| 2016/0136821 A1 | 5/2016 | Vaughn |
| 2019/0060791 A1 | 2/2019 | Dyer |

FOREIGN PATENT DOCUMENTS

| | | |
|---|---|---|
| EP | 1810742 B1 | 7/2007 |
| EP | 3446982 A1 | 2/2019 |
| EP | 3456944 A1 | 3/2019 |
| FR | 2999653 A1 | 6/2014 |

OTHER PUBLICATIONS

European Search Report for Application No. 18189736.4-1010, dated Jan. 4, 2019, 8 pages.
European Search Report for Application No. 18193861.4-1007 dated Feb. 12, 2019, 6 pages.
European Search Report for Application No. 19152158.2 dated Jun. 11, 2019, 11 pages.

* cited by examiner

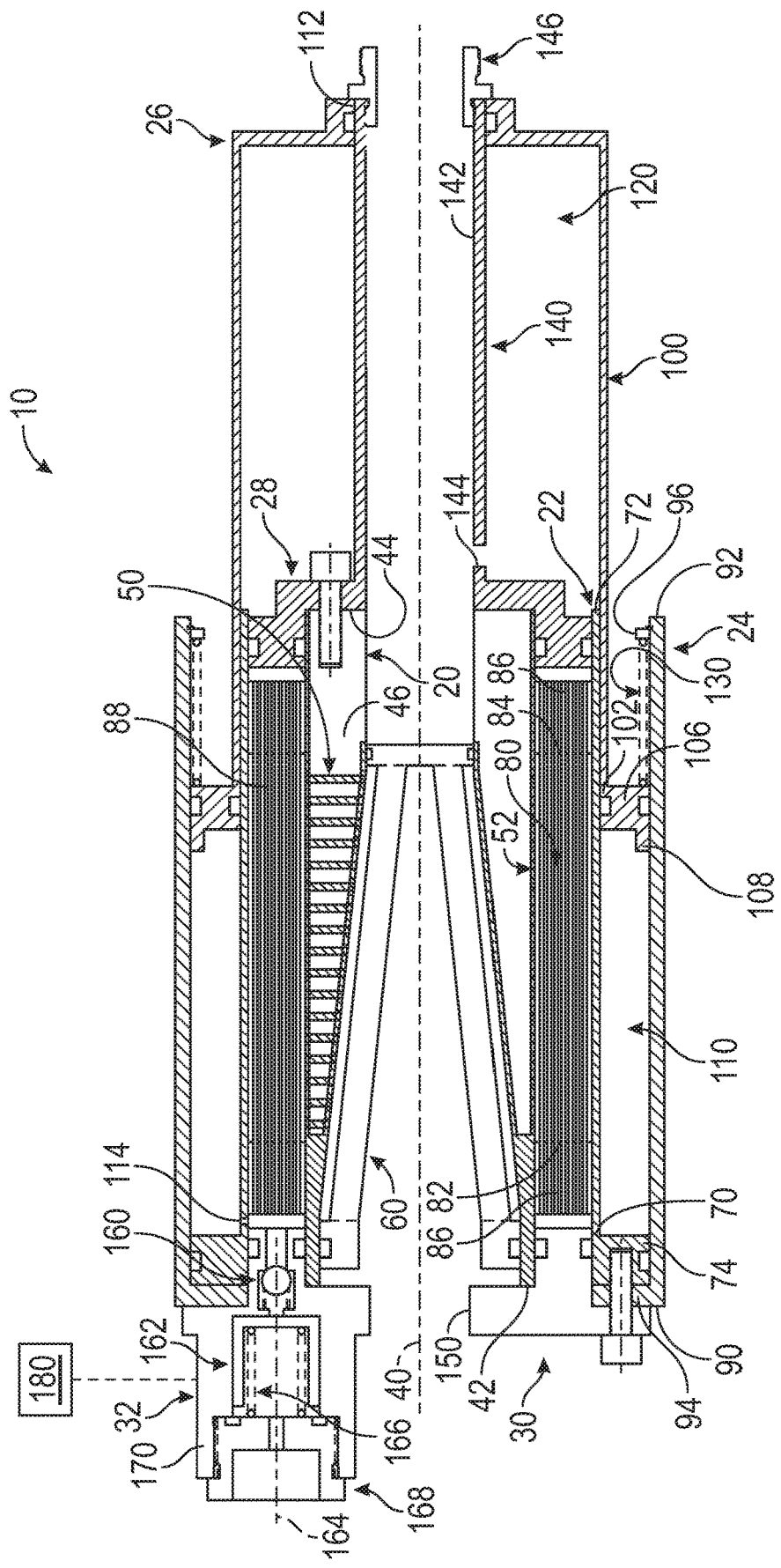

INTEGRATED O2RU SYSTEM

BACKGROUND

Quantities of oxygen may readily dissolve into various liquid media such as a hydrocarbon fuel. In certain applications, the hydrocarbon fuel may be used as a coolant for various systems of a vehicle such as an aircraft engine. The dissolved oxygen within the hydrocarbon fuel may react at elevated temperatures to form free radicals such as coke precursors that may lead to the formation of deposits. These deposits may clog fuel filters, injectors, or other fuel system components.

Accordingly, it is desirable to remove the dissolved oxygen from the hydrocarbon fuel to limit coke formation.

BRIEF DESCRIPTION

Disclosed is an oxygen removal system for removing dissolved oxygen from fuel within a fuel system. The oxygen removal system includes a first housing, a second housing, a membrane filter, a piston assembly, and an outlet cap. The first housing extends along a first axis between a first housing first end and a first housing second end. The first housing defines a plurality of holes that are disposed transverse to the first axis. The second housing is disposed about the first housing. The second housing extends along the first axis between a second housing first end and a second housing second end. The membrane filter is disposed between the first housing and the second housing. The piston assembly has a piston housing that is disposed about the second housing. The piston housing extends along the first axis between a piston housing first end and a piston housing second end. The piston housing second end, the first housing second end, and the second housing second end define a cavity. The piston assembly is arranged to generate a vacuum to remove a fluid from the membrane filter. The outlet cap is disposed within the cavity.

In addition to one or more of the features described herein, the outlet cap is secured to the first housing second end.

In addition to one or more of the features described herein, a fuel filter is received within the first housing and arranged to receive fuel along the first axis and discharge fuel through the plurality of holes.

In addition to one or more of the features described herein, a leakage protection valve is disposed within a valve body that extends towards an end of the membrane filter.

In addition to one or more of the features described herein, an extension member extends along the first axis from the outlet cap through an opening defined by the piston housing second end.

In addition to one or more of the features described herein, the extension member is a hollow member that defines a first fluid outlet.

In addition to one or more of the features described herein, the extension member defines a second fluid outlet that is disposed transverse to the first fluid outlet.

In addition to one or more of the features described herein, the second fluid outlet is fluidly connected to the cavity.

In addition to one or more of the features described herein, a third housing is disposed about the piston housing and the second housing, and extends along the first axis between a third housing first end and a third housing second end.

In addition to one or more of the features described herein, the third housing first end is secured to the second housing first end.

In addition to one or more of the features described herein, the piston housing is movable along the first axis relative to the membrane filter, the second housing, and the third housing.

Also disclosed is an oxygen removal system that includes a first housing, a second housing, a membrane filter, a third housing, and an end cap. The first housing extends between a first housing first end and a first housing second end, the first housing receives a fuel filter. The second housing is disposed about the first housing and extends between a second housing first end and a second housing second end. The membrane filter is disposed between the first housing and the second housing. The third housing is disposed about the second housing and extends between a third housing first end and a third housing second end. The third housing first end has a first flange that extends towards the first housing. The end cap abuts the first flange and extends into at least one of the third housing and the second housing.

In addition to one or more of the features described herein, an outlet cap is disposed opposite the end cap, the outlet cap abuts the first housing second end.

In addition to one or more of the features described herein, the outlet cap is at least partially disposed between the first housing and the second housing.

In addition to one or more of the features described herein, a piston assembly has a piston housing disposed between the second housing and the third housing. The piston housing extends between a piston housing first end and a piston housing second end.

In addition to one or more of the features described herein, the third housing second end has a second flange that extends towards the piston housing.

In addition to one or more of the features described herein, the piston housing is movable between a first position in which the piston housing first end abuts the second housing first end and a second position in which the piston housing first end is spaced apart from the second housing first end.

In addition to one or more of the features described herein, a biasing member extends between the second flange and a piston skirt extending from the piston housing first end towards the third housing.

In addition to one or more of the features described herein, the biasing member biases the piston housing towards the first position.

In addition to one or more of the features described herein, a valve assembly is operatively connected to the end cap and extending towards the membrane filter.

BRIEF DESCRIPTION OF THE DRAWINGS

The following descriptions should not be considered limiting in any way. With reference to the accompanying drawings, like elements are numbered alike:

FIG. 2 is a cross-sectional view of the oxygen removal system and a second position.

DETAILED DESCRIPTION

Figure 1A:
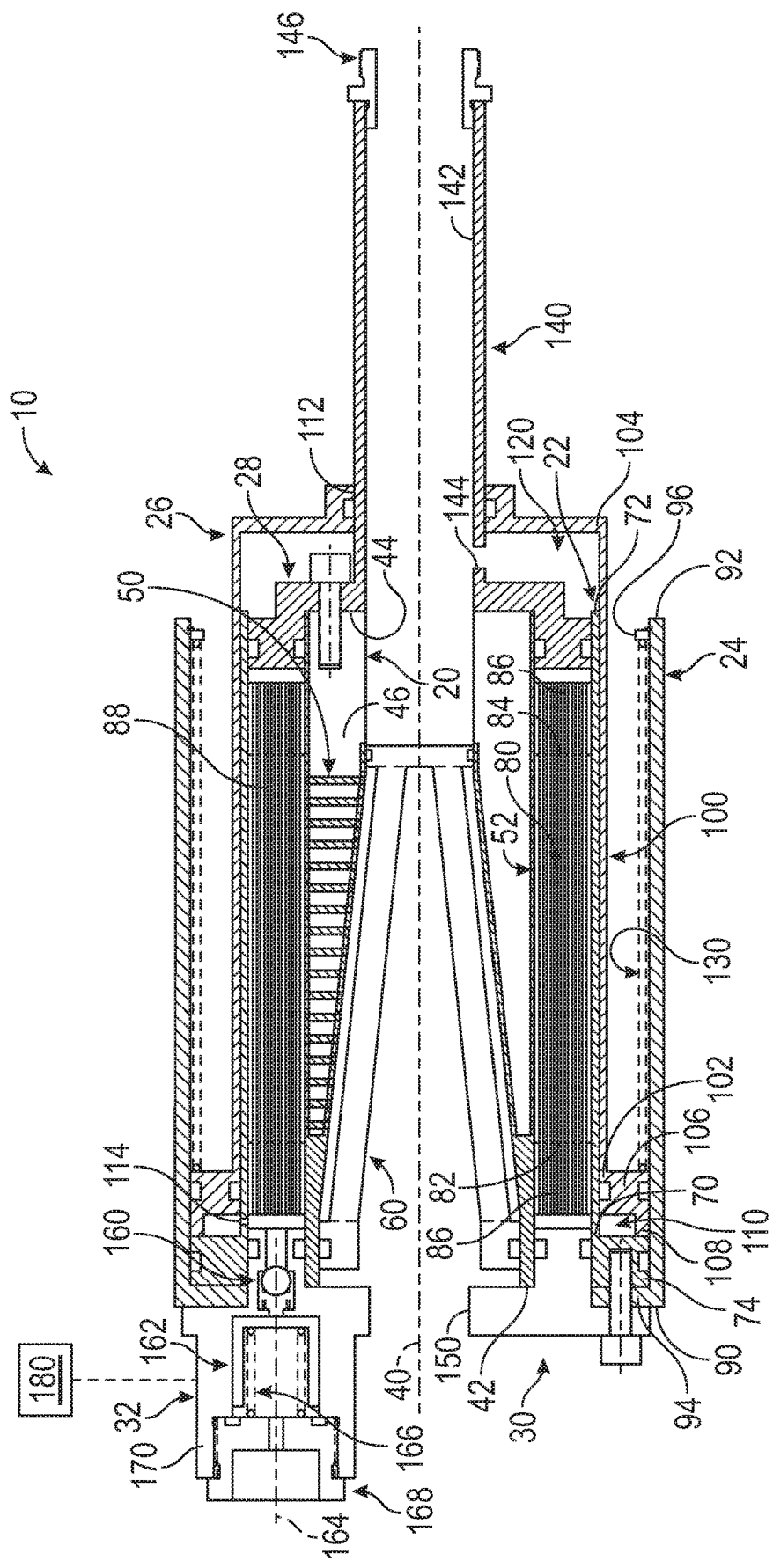
FIG. 1A is a cross sectional view of an oxygen removal system in a first position.

A detailed description of one or more embodiments of the disclosed apparatus are presented herein by way of exemplification and not limitation with reference to the Figures.

Referring to FIGS. 1A, 1B, 1C and 2, an oxygen removal system 10 for removing dissolved oxygen from fuel is shown. The oxygen removal system 10 is incorporated into a fuel system and is arranged to remove the dissolved oxygen within the fuel to inhibit or reduce the formation of coke or other deposits when the fuel is heated. The removal of the dissolved oxygen may enable the fuel system to operate at a higher temperature and therefore increase overall efficiency of the energy conversion unit, e.g. engine, which incorporates the fuel system having oxygen removal system 10.

The oxygen removal system 10 is an integrated unit that includes a first housing 20, a second housing 22, a third housing 24, a piston assembly 26, an outlet cap 28, an end cap 30, and a valve assembly 32. The first housing 20, the second housing 22, the third housing 24, the piston assembly 26, the outlet cap 28, and the end cap 30 are disposed concentrically with each other. The integration of the above identified components into a single unit may eliminate plumbing lines that connect the individual elements of the oxygen removal system 10 as well as to reduce the overall size of the oxygen removal system 10.

The first housing 20 extends along a first axis 40 between a first housing first end 42 and a first housing second end 44. The first housing first end 42 is provided with a first inner diameter and the first housing second end 44 is provided with a second inner diameter that is less than the first inner diameter. An inner surface of the first housing 20 is configured as a tapered surface having a taper that extends from the first housing first end 42 towards the first housing second end 44.

The first housing 20 defines a support rib 46 that extends from the first housing second end 44 towards the first housing first end 42.

The first housing 20 defines a first plurality of holes 50 and a second plurality of holes 52 that are disposed transverse to the first axis 40. The first plurality of holes 50 extend between the first housing first end 42 and the first housing second end 44.

The first housing 20 may be arranged as a fuel filter housing that receives a fuel filter 60. The fuel filter 60 includes sealing elements that engage the inner surface of the first housing 20. The fuel filter 60 is arranged to receive fuel along the first axis 40, turn the fuel, and enable the fuel to exit or be discharged in a direction that is disposed transverse to the first axis 40 and through the first plurality of holes 50 of the first housing 20 towards the second housing 22.

The second housing 22 is disposed about and is spaced apart from the first housing 20. The second housing 22 extends along the first axis 40 between a second housing first end 70 and the second housing second end 72. The second housing 22 includes a skirt 74 that is disposed proximate the second housing first end 70 and radially extends away from the first axis 40 towards the third housing 24. The skirt 74 includes a sealing element that slidably engages the third housing 24. The second housing second end 72 is configured as an open end.

A membrane filter 80 is disposed between the first housing 20 and the second housing 22. The membrane filter 80 includes a tube bundle or a plurality of hollow tubes 88 that extend along the first axis 40 between a first membrane end 82 and a second membrane end 84. The plurality of hollow tubes 88 are formed into a hollow cylindrical shaped bundle that are supported by potting or an epoxy 86 at the first membrane end 82 and at the second membrane end 84. The potting or epoxy 86 adheres the plurality of hollow tubes 88 together but allows the first membrane end 82 and the second membrane end 84 to be open to be subject to the vacuum generated by the piston assembly 26.

Figure 1C:
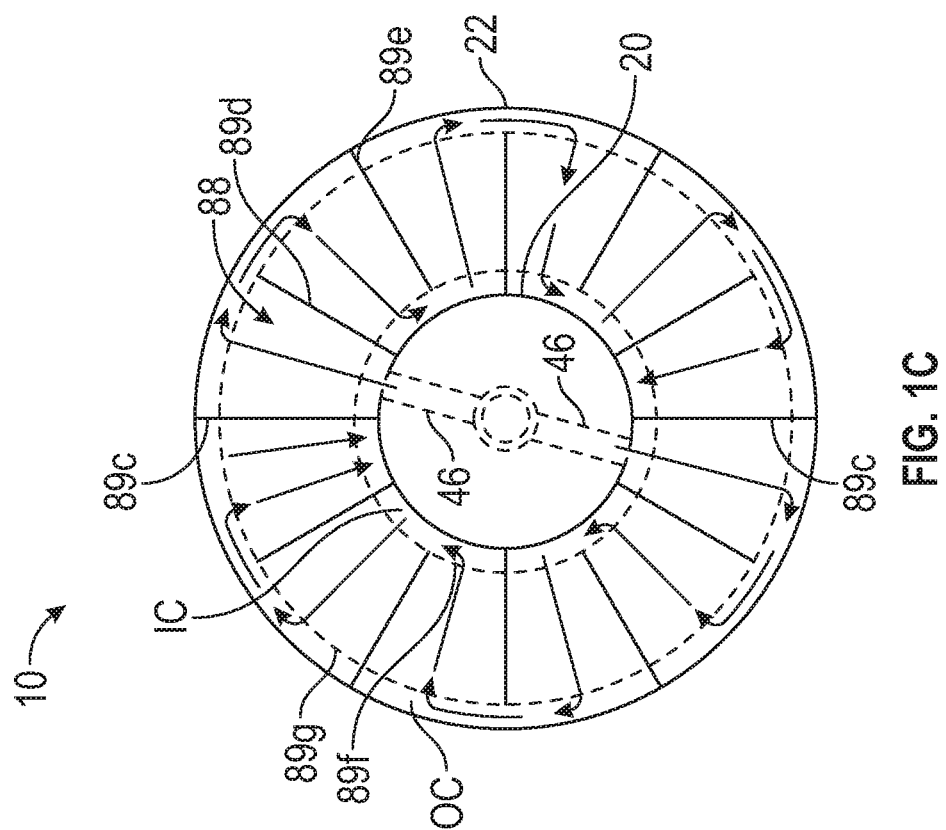
FIG. 1C is an end view of the oxygen removal system according to another embodiment.
Figure 1B:
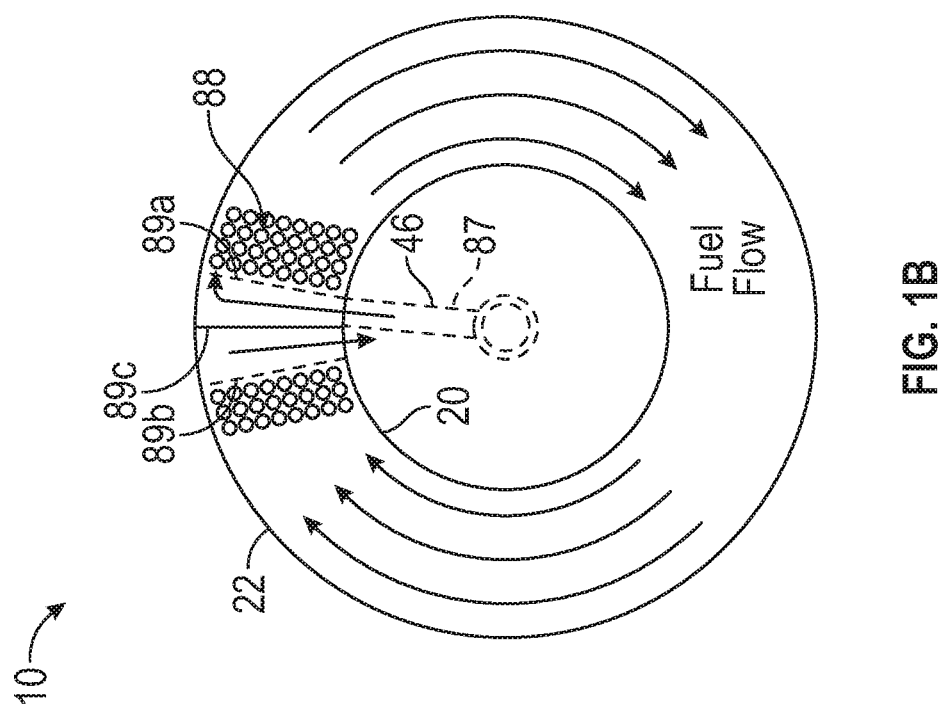
FIG. 1B is an end view of the oxygen removal system according to an embodiment.

Referring to FIGS. 1A-1C, the plurality of hollow tubes 88 are selectively permeable membrane tubes that are disposed within a first flow circuit that is defined between the first housing 20 and the second housing 22. The plurality of hollow tubes are disposed at least partially about a circumference of the first housing 20 that includes multiple holes that are axially spaced apart along a length of the membrane filter 80. The multiple holes ensure a uniform fuel flow through the plurality of hollow tubes 88 to maximize the efficiency of each tube. Fuel flows radially through the first plurality of holes 50 of the first housing 20 and flows over the plurality of hollow tubes 88 of the membrane filter 80. As the fuel passes over the plurality of hollow tubes of the membrane filter 80, oxygen is drawn from the fuel through the membrane filter 80 and into the center of each tube of the plurality of hollow tubes 88. A second flow circuit fluidly communicates with an inner channel or center of the tubes of the plurality of hollow tubes 88 such that a vacuum draws or carries away oxygen that is pulled from the fuel that flows around the plurality of hollow tubes 88 of the membrane filter 80 and is within the inner channel of center of a tube of the plurality of hollow tubes 88. The center of a tube of the plurality of hollow tubes 88 is partially isolated from the first flow circuit such that the vacuum does not pass through a wall of a tube of the plurality of hollow tubes 88. The fuel flows across or over the plurality of hollow tubes 88 of the membrane filter 80 and exits the membrane filter 80 through the second plurality of holes 52 of the first housing 20 and then is turned to flow axially towards an outlet of the oxygen removal system 10.

In the embodiment shown in FIG. 1B, the plurality of hollow tubes 88 may be disposed between the first housing 20 and the second housing 22 and may at least partially disposed about a circumference of the first housing 20. The support rib 46 may at least partially define the first plurality of holes 50 and a plurality of holes 87. A first grate 89a may be disposed between an opening to the first flow circuit and the plurality of hollow tubes 88 and a second grate 89b may be disposed between an opening to the second flow circuit and the plurality of hollow tubes 88. A divider wall 89c may extend between the first housing 20 and the second housing 22 that prevents flow from short circuiting from the inlet to the outlet such that fuel is forced to flow around the entire circumference of the first housing 20 and through the plurality of hollow tubes 88 of the membrane filter 80.

The flow may pass over an outside surface of a tube of the plurality of hollow tubes 88 as the flow travels circumferentially, as shown in FIG. 1B, while a flow that passes through the inner channel of a tube of the plurality of hollow tubes 88 may be drawn out through the second flow circuit.

In the embodiment shown in FIG. 1C, a first wall 89d and a second wall 89e are disposed between the first housing 20 and the second housing 22 to cause flow within the first flow path to move radially outward and inward as the flow flows around the circumference of the first housing 20. For example, the first wall 89d and the second wall 89e may define a labyrinth path such that the first wall 89d extends from the first housing 20 towards but does not reach the second housing 22 and the second wall 89e extends from the second housing 22 towards but does not reach the first housing 20.

An inner grate 89f may overlay one or more inner pass through channels, IC, between each wall pair 89d, 89e. An outer grate 89g may overlay one or more outer pass through channels, OC, between each wall pair 89d, 89e. The plurality of hollow tubes 88 of the membrane filter 80 may be disposed between the inner grate 89f and the outer grate 89g such that flow is radial through each tube section of the plurality of hollow tubes 88.

The flow may travel radially outward through each section of tubes of the plurality of hollow tubes 88 into the outer pass through channels, OC, where the flow may travel circumferentially to the next section of tubes where the flow travels radially inward to the inner pass through channels, IC.

The third housing 24 is disposed about the second housing 22 and the piston assembly 26. The third housing 24 extends along the first axis 40 between a third housing first end 90 and a third housing second end 92. The third housing 24 has a first flange 94 that is disposed proximate the third housing first end 90 and extends towards the first housing 20 and the first axis 40. The first flange 94 engages the skirt 74 of the second housing 22. The first flange 94 facilitate securing the third housing first end 90 to the second housing first end 70. The third housing 24 has a second flange 96 that is disposed proximate the third housing second end 92 and extends towards the first housing 20, the piston assembly 26, and the first axis 40.

The piston assembly 26 is at least partially disposed about the second housing 22 and is disposed between the second housing 22 and the third housing 24. The piston assembly 26 includes a piston housing 100. The piston housing 100 extends along the first axis 40 between a piston housing first end 102 and a piston housing second end 104.

The piston housing 100 includes a piston skirt 106 that is disposed proximate the piston housing first end 102 and radially extends towards the third housing 24. The piston skirt 106 includes an extension or a spacer 108 that extends axially towards the skirt 74 of the second housing 22. The combination of the skirt 74 of the second housing 22, the spacer 108 of the piston skirt 106, and the piston skirt 106 of the piston housing 100 define a first chamber 110. The first chamber 110 is arranged to receive oxygen that is removed from the fuel by the membrane filter 80.

The piston housing second end 104 defines an opening 112 that is disposed about the first axis 40. The piston housing first end 102 defines a port 114 that is fluidly connected to the first chamber 110.

A cavity 120 is defined by the piston housing second end 104, the first housing second end 44, and the second housing second end 72.

A biasing member 130 extends between the second flange 96 of the third housing 24 and the piston skirt 106 of the piston housing 100. The biasing member 130 is arranged to bias the piston housing 100 towards a first position in which the piston housing first end 102 approximately abuts the second housing first end 70.

The piston housing 100 is movable between a first position, as shown in FIG. 1, and a second position, as shown in FIG. 2, relative to the first housing 20, the fuel filter 60, the second housing 22, the membrane filter 80, and the third housing 24. The spacer 108 of the piston skirt 106 of the piston housing 100 engages the skirt 74 of the second housing 22 while the piston housing 100 is in the first position, and pressurized fuel is not provided to the oxygen removal system 10. As pressurized fuel enters the oxygen removal system 10, the pressure acting on the piston housing 100 overcomes the spring force provided by the biasing member 130 and moves the piston housing 100 towards the second position. The piston housing first end 102 is spaced apart from the second housing first end 70 such that the spacer 108 of the piston skirt 106 does not engage the skirt 74 of the second housing 22 while the piston housing 100 is in the second position. As the piston housing 100 moves towards the second position, a vacuum is created to draw the oxygen from within the tubes of the membrane filter 80 and is directed towards the cavity 120.

The outlet cap 28 is disposed within the cavity 120 and is disposed opposite the end cap 30. The outlet cap 28 is at least partially disposed between the first housing 20 and the second housing 22. The outlet cap 28 abuts and is secured to the first housing second end 44. A fastener extends through the outlet cap 28 and into the support rib 46 to secure the outlet cap 28 to the first housing 20.

The outlet cap 28 includes an extension member 140 that extends along the first axis 40 from a portion of the outlet cap 28 through the opening 112 of the piston housing 100. The piston housing 100 is arranged to ride along or slidably engage the extension member 140 as the piston housing 100 moves between the first position and the second position.

The extension member 140 is configured as a hollow member that defines a first fluid outlet 142 that extends along the first axis 40. The first fluid outlet 142 is arranged to discharge fuel axially along the first axis 40 such that the fuel may be delivered to other systems. The extension member 140 defines a second fluid outlet 144 that is disposed transverse to the first axis 40 and is disposed transverse to the first fluid outlet 142. The second fluid outlet 144 is fluidly connected to the cavity 120. In at least one embodiment, a cap 146 is disposed proximate an end of the extension member 140. The cap 146 extends at least partially into the extension member 140 and includes a portion that is disposed transverse to and abuts an end of the extension member 140.

The end cap 30 is disposed opposite the outlet cap 28. The end cap 30 is disposed proximate the first housing first end 42, the second housing first end 70, and the third housing first end 90. The end cap 30 abuts the first flange 94 and is arranged to receive a fastener that extends through the first flange 94 and into the skirt 74 of the second housing 22 to secure the end cap 30 to the third housing 24 and the second housing 22.

The end cap 30 defines a fuel inlet 150 that is disposed about the first axis 40. The fuel inlet 150 is arranged to receive fuel axially along the first axis 40 such that it enters into the oxygen removal system 10.

The end cap 30 extends into a region that is disposed between the first housing 20 and the second housing 22. The end cap 30 is arranged to receive the valve assembly 32.

The valve assembly 32 is operatively connected to the end cap 30 and extends towards the membrane filter 80 within the region that is disposed between the first housing 20 and the second housing 22.

The valve assembly 32 includes a first valve 160 and a second valve 162 that are disposed within a valve body 170 that extends through the end cap 30 and extends into the first flow circuit that is defined between the first housing 20 and the second housing 22 such that the valve body 170 extends towards an end of the membrane filter 80. The first valve 160 and the second valve 162 are arranged axially along a second axis 164 that is disposed substantially parallel to the first axis 40. The first valve 160 is configured as a check valve that is fluidly connected to the first chamber 110 that collects oxygen that is purged from the membrane filter 80. As oxygen is removed from the fuel and is collected within the first chamber 110, the first valve 160 may open and vent the removed oxygen to ambient around the second valve 162.

The second valve 162 is fluidly connected to the first valve 160. The second valve 162 is configured as a leakage protection valve. The second valve 162 allows oxygen to pass through the second valves diametrical clearance, but the second valve 162 may translate along the second axis 164 to compress a biasing member 166 should the first chamber 110 become pressurized due to fuel entering the first chamber 110 or the first chamber 110 exceeding a predetermined pressure. As the biasing member 166 is compressed, the second valve 162 moves towards a leakage inhibit position in which the second valve 162 engages a seal 168. The seal 168 is at least partially received within a valve body 170 that contains both the first valve 160 and the second valve 162.

The second valve 162 is in communication with a sensor or a switch 180 that is in communication with a controller. A message is output for display by the controller, responsive to the second valve 162 engaging the seal 168.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An oxygen removal system for removing dissolved oxygen from fuel within a fuel system, comprising:
   a first housing extending along a first axis between a first housing first end and a first housing second end, the first housing defining a first plurality of holes and a second plurality of holes, the first and second plurality of holes being disposed transverse to the first axis, the first housing defining an a fuel filter housing into which the fuel enters the system;
   a second housing disposed about the first housing, the second housing extending along the first axis between a second housing first end and a second housing second end;
   a membrane filter disposed between the first housing and the second housing;
   a third housing disposed about the second housing and defining a chamber between the second housing and third housing to receive pressurized air;
   a piston assembly having a piston housing disposed about the second housing and between the second housing and the third housing, the piston housing extending along the first axis between a piston housing first end and a piston housing second end, the piston housing second end, the first housing second end, and the second housing second end defining a vacuum cavity, the piston assembly being arranged to generate a vacuum in the vacuum cavity to remove a fluid from the membrane filter;
   wherein when pressurized air is provided into the chamber, the piston is moved from a first position to a second position where the vacuum is formed in the vacuum cavity;
   an outlet cap disposed within the cavity and that forms a first fuel outlet;
   wherein the fluid flows from the fuel filter housing, enters the first housing through the first plurality of holes flows across, flows across the membrane filter and exits the first housing through the second plurality of holes; and
   a biasing member biasing the piston housing towards the first position.

2. The oxygen removal system of claim 1, wherein the outlet cap is secured to the first housing second end.

3. The oxygen removal system of claim 1, further comprising a fuel filter received within the first housing and arranged to receive fuel along the first axis and discharge fuel through the first plurality of holes.

4. The oxygen removal system of claim 1, further comprising a leakage protection valve disposed within a valve body that extends towards an end of the membrane filter.

5. The oxygen removal system of claim 1, further comprising an extension member that extends along the first axis from the outlet cap through an opening defined by the piston housing second end.

6. The oxygen removal system of claim 5, wherein the extension member is a hollow member that defines the first fluid outlet.

7. The oxygen removal system of claim 6, wherein the extension member defines a second fluid outlet that is disposed transverse to the first fluid outlet.

8. The oxygen removal system of claim 7, wherein the second fluid outlet is fluidly connected to the cavity.

9. The oxygen removal system of claim 5, wherein the third housing extends along the first axis between a third housing first end and a third housing second end.

10. The oxygen removal system of claim 9, wherein the third housing first end is secured to the second housing first end.

11. The oxygen removal system of claim 10, wherein the piston housing is movable along the first axis relative to the membrane filter, the second housing, and the third housing.

* * * * *